MAJORITY LOGIC MULTIPLIER CIRCUIT

Filed Oct. 9, 1964 2 Sheets-Sheet 1

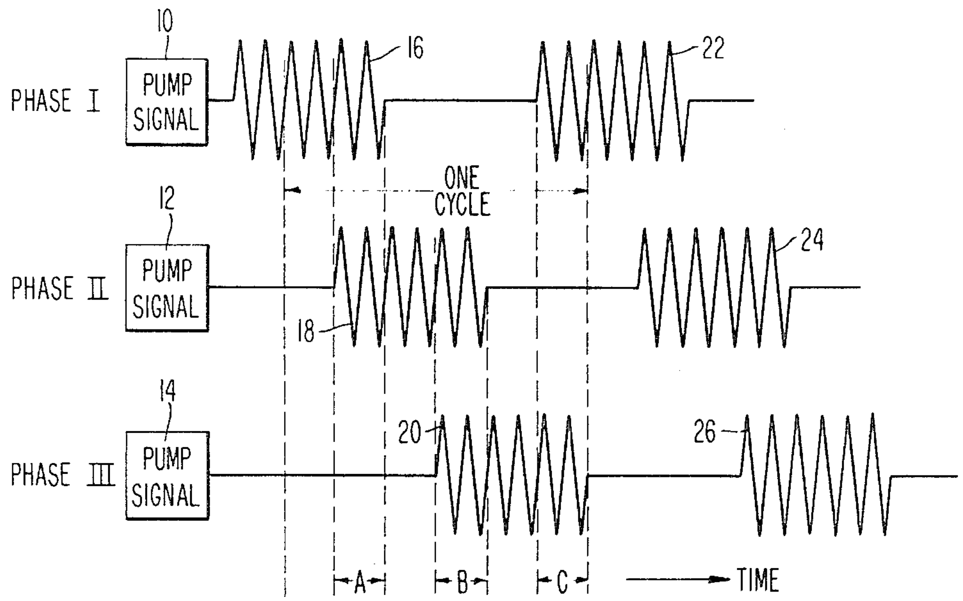

A = TIME DURING WHICH INFORMATION FROM PARAMETRONS OF PHASE I IS TRANSMITTED TO PARAMETRONS OF PHASE II.

B = TIME DURING WHICH INFORMATION FROM PARAMETRONS OF PHASE II IS TRANSMITTED TO PARAMETRONS OF PHASE III.

C = TIME DURING WHICH INFORMATION FROM PARAMETRONS OF PHASE III IS TRANSMITTED TO PARAMETRONS OF PHASE I.

Fig 1

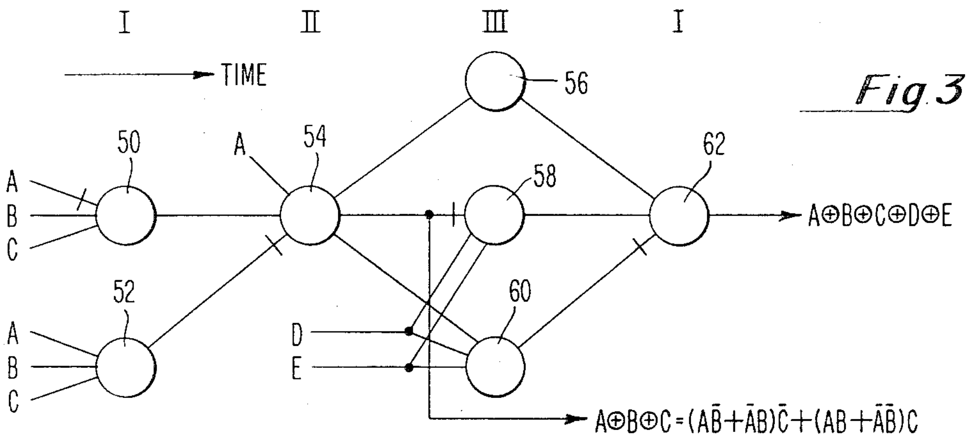

Fig 3

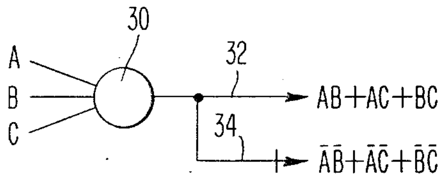

Fig 2

INVENTOR.
HENRY G. MATTHEWS JR

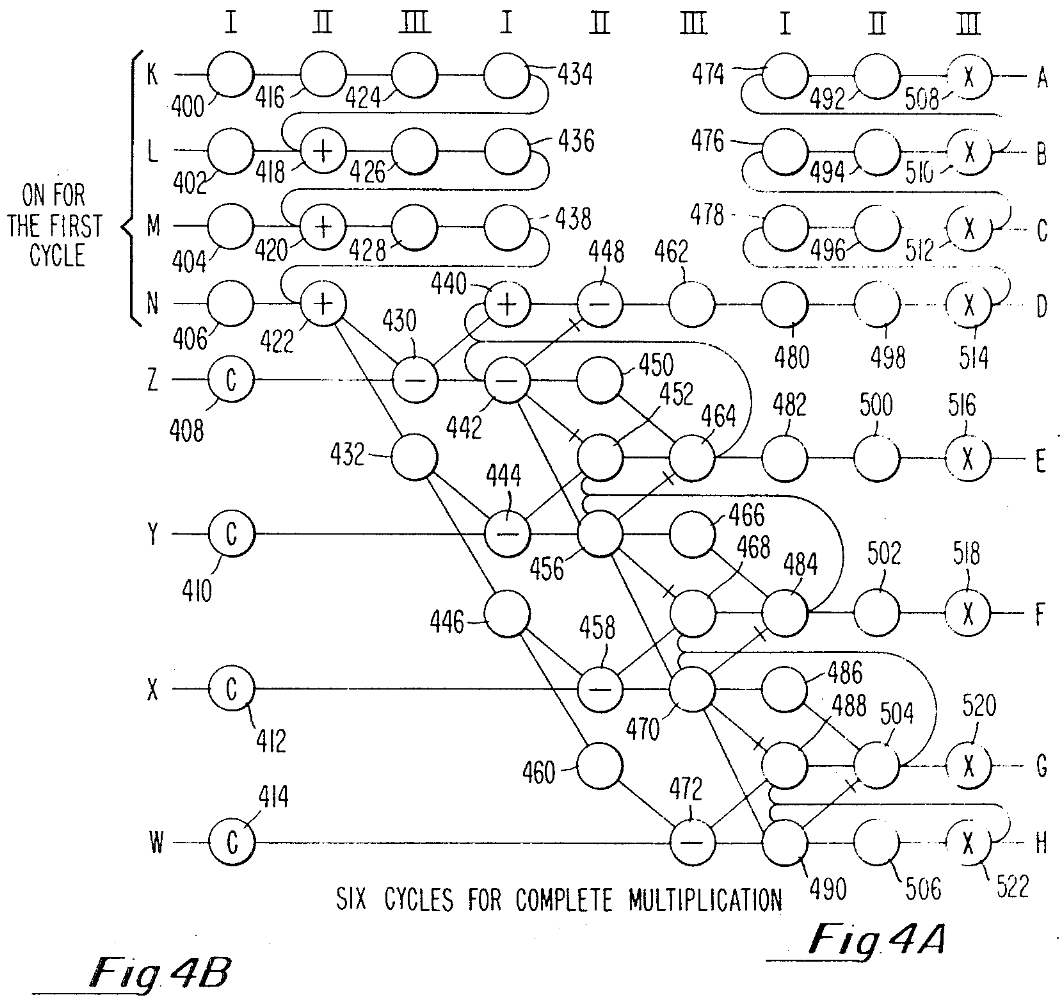

Fig 4A

Fig 4B

| SYMBOL | DEFINITION |
|---|---|
| I, II, III | THE THREE PHASES WITHIN A TIMING CYCLE. GATES OF PHASE I MAY FEED ONLY GATES OF PHASE II. SIMILARLY, PHASE II FEEDS PHASE III, AND PHASE III FEEDS PHASE I. NO OTHER PATHS ARE ALLOWED. |
| ◯ | A MAJORITY GATE WHICH GIVES A ONE OUTPUT IF A MAJORITY OF THE INPUTS ARE ONE'S. ONLY AN ODD NUMBER OF INPUT ARE ALLOWED. |
| ⊖ | AND GATE [NEGATIVE (0) INPUT BIAS] |
| ⊕ | OR GATE [POSITIVE (1) INPUT BIAS] |
| Ⓒ | CONSTANT PARAMETRON (ALWAYS ON) |
| A —+ Ā | INVERTER [REVERSED WINDING] |
| ⊕ | EXCLUSIVE-OR CONNECTIVE $(A \oplus B = A\cdot\bar{B} + \bar{A}\cdot B)$ |
| Ⓧ | OUTPUT POINTS |

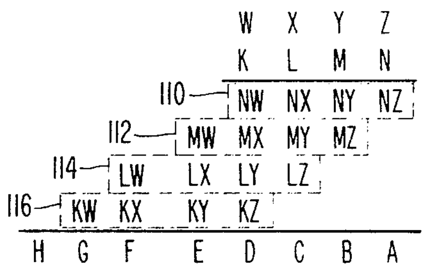

Fig 4C

INVENTOR
HENRY G. MATTHEWS JR

United States Patent Office 3,469,086
Patented Sept. 23, 1969

3,469,086
MAJORITY LOGIC MULTIPLIER CIRCUIT

Henry G. Matthews, Jr., Narberth, Pa., assignor to Burroughs Corporation, Detroit, Mich., a corporation of Michigan Filed Oct. 9, 1964, Ser. No. 402,783
Int. Cl. G06f 7/39
U.S. Cl. 235—164 14 Claims

ABSTRACT OF THE DISCLOSURE

A majority logic device for use in a data processor is disclosed which performs binary arithmetic multiplication in a manner similar to manual or longhand multiplication. This, of course, is in contrast to the usual computer method using successive binary additions. The specific configuration illustrated is a four-bit parametric multiplier which utilizes a plurality of parametrons operated from a three-phase pump source to successively add partial products and generate "carries" at three times the clock frequency repetition rate.

The present invention relates to a circuit and a method for multiplying binary data. More particularly, it relates to a binary multiplier using majority logic elements in a novel way to perform binary multiplication more rapidly than usual.

The logical systems used in the digital computer art are constantly being improved. Some of the goals sought by these improvements are increased simplicity, increased speed, and reliability.

One of the more recent concepts is a logical system known as majority logic. The basic consideration in such a system is the application of multiple inputs to a logical gate with the gate output being responsive to the condition of a majority of them.

One of the noteworthy assets of a majority function element, and one which permits a considerable saving in logical design, is its ability to inherently provide a self-complementing signal. No similar function can be achieved using conventional AND/OR logic elements without providing additional circuitry. The output signal from an $n$-input gate is a one when a majority of the $n$ inputs are one. Thus, for example, where $n=5$ three or more of the inputs must equal one for the output to be one. A complementary output signal is also provided.

The electrical building blocks currently employed in many majority logic systems are parametrons. By their nature, parametrons are more adaptable to serial operation rather than parallel. Serial operation is, of course, a natural enemy of system speed. In spite of this, if very high cycle rates are used with the parametron circuits, the design of very simple, compact, and highly reliable computers can be achieved. But, these very high cycle rates are difficult to achieve and they impose excessive limitations both on system cost and design. Consequently, alternate approaches were sought.

To increase the operating speed of a parametric majority logic computer, without a corresponding increase in clock rate, required the development of new methods and means for performing the arithmetic and control functions in such a computer. For example, a basic deviation was noted when it was found desirable to have separate circuits for addition and multiplication. While the time consumed by a serial adder circuit was permissible, the time consumption of the usual multiplier circuit using the usual add and shift method of multiplication was far too expensive to be tolerated.

It is, therefore, a prime object of this invention to provide a novel multiplication method and means for use in a computer with a majority logic system.

It is still another object of this invention to provide a parametric majority logic multiplier circuit whose interconnections enable operation similar in principle to the longhand method of multiplication.

It is also an object of this invention to provide a majority logic multiplier which includes a staggered plurality of parametric majority logic exclusive OR gates to provide partial sums and majority logic gates to provide carry-over capability.

Various other objects and advantages will appear in the following description of one embodiment of the invention, and the novel features will be particularly pointed out hereinafter in connection with the appended claims. The invention itself, however, both as to organization and method of operation, may be best understood by reference to the following description taken in connection with the accompanying drawings wherein:

FIGURE 1 is an illustration of the three-phase pump (clock pulse) system used in conjunction with the operation of the parametrons of the present multiplier circuit.

FIGURE 2 is an illustrative example of a basic majority logic gate used in the present logical multiplier.

FIGURE 3 is a logical diagram of a five-input exclusive OR gate, as well as an intermediate three-input exclusive OR gate, such as is utilized by the present invention of FIGURE 4A.

FIGURE 4A is the complete logical diagram of a four-bit logic multiplier as practiced by the present invention.

FIGURE 4B is a table of symbolic connotations used in the multiplier circuit of FIGURE 4A together with their corresponding definitions.

FIGURE 4C illustrates the longhand multiplication process of arithmetic manipulation shown in terms corresponding to those used by the multiplier of FIGURE 4A.

Referring in particular to FIGURE 1, the three-phase clock source system (phases I, II and III) shown is necessary for operation of the parametrons. It is required to separate the input signals from the output signals of a parametron. These three signals or phases I, II and III are respectively supplied by three completely separate clock or pump signal sources 10, 12 and 14. Any one particular parametron may be pumped by a clock of only one of these phases. That is, the signals 16, 18 and 20 are applied to three completely different groups of parametrons within the system. While the clock signals are never interchanged, the information contained in one group of parametrons may be transferred or transmitted to another group. This transfer, however, must be accomplished according to certain rules. It must be done only between certain groups and only during specified times. The transfer time periods are denoted in FIGURE 1 as A, B and C. The rules governing the intergroup transmissions are given immediately below the clock signal waveforms.

As an example, consider a one-cycle period. This is the time between corresponding points within any one phase. Further, assume all signals as having a first, a second and a third portion. More specifically, consider the cycle of phase I signal from pump signal source 10, between the ⅓ point of signal 16 and the corresponding ⅓ point of the next signal 22. During the second or middle ⅓ portion of the duration of clock signal 16, it is the sole clock signal present. In the last third of its duration, however, the clock signal 18 from phase II pump signal source 12 is also present. This time period during which clock signals 16 and 18 are both present is noted as A in FIGURE 1. During this period the information contained in the group of parametrons supplied by phase I may be transmitted to the parametron group supplied by phase II. No other transfers are possible. Similarly, during the latter ⅓ of the clock signal 18 from the phase II pump source 12, the initial ⅓ of the clock signal 20 from the phase II pump source 14 is also present. This time period is referred to as B in FIGURE 1. During this period the information contained in the parametrons supplied by phase II pump source 12 may be transferred into those parametrons supplied by phase III pump source 14. The final ⅓ portion of clock signal 20 overlaps in time with the initial ⅓ of clock signal 22 from phase I pump source 10 to initiate the recycling. This time period is noted as C on FIGURE 1. It is during this period that information contained in the phase III parametrons may be transferred to those of phase I. It is this overlapping of the respective clock signals which enables the information transfer between parametrons. However, it should be recalled that this three-phase system is a requirement of the parametrons and not of majority logic as such, since it is necessary to separate the input and output portions of the parametron operation.

Referring next to FIGURE 2, there is shown an $n$-input majority logic gate 30. Three input signals A, B and C are shown; therefore, $n=3$. The output signal of an $n$-input majority gate is expressed by forming the sum of the products of all possible pairs of the three inputs. Therefore, one output signal 32 is $AB+AC+BC$. As previously mentioned, a majority logical element also has a self-complementing feature. Consequently a complementary output signal 34, corresponding to $\overline{AB}+\overline{AC}+\overline{BC}$ is also provided from gate 30. The bar over a letter indicates its inversion.

Referring to FIGURE 3, a majority logic exclusive OR gate having five inputs is shown. It also includes such a gate having three inputs. The exclusive OR connective used to illustrate the output signal is ⊕. The gate of FIGURE 3 may be extended to become an exclusive OR gate having $n$-inputs. The time in phases required to join $n$ inputs by the exclusive OR connective ⊕ is $n-1$ successive phases. Thus, for $n=3$ inputs, the time required is 2 phases. For 5 inputs, the joining time necessary is 4 phases.

It will be remembered that an exclusive OR gate produces a sum output but does not provide a carry output. As presently used, it reacts by providing an output when an odd number of inputs are applied. Thus, in the present three-input exclusive OR gate, a ONE output is provided when any one of the three inputs is ONE or when all three are ONE. It does not respond when two of the three are ONE.

Referring to FIGURE 3, four successive phases I, II and III and I are shown, since, as previously mentioned, four phase times are required to accommodate 5 inputs (A, B, C, D and E). It is seen also that were only 3 inputs (A, B and C) applied, the output A⊕B⊕C would be available after 2 phases. Starting on the left side of FIGURE 3, inputs A, B and C are applied to majority logic gate 52 and inputs $\bar{A}$ (complement of A), B and C are applied to gate 50. Upon activation by phase I pump source 10 (FIG. 1), the gates 50 and 52 respond to their respective inputs. When gate 54 is activated by phase II pump source 12 (FIG. 1), this response is transferred from gates 50 and 52 to gate 54. Note, however, that it is the complementary output which is transferred from gate 52. The input A is also applied to gate 54. Next, majority gates 56, 58 and 60 are activated by phase III pump source and information from gate 54 is transferred simultaneously into all three gates. Gate 58, however, receives complementary information to that received by gates 56 and 60. The noncomplementary output of gate 54 would be the output of the exclusive OR circuit were only three inputs A, B and C applied. However, when a five-input exclusive OR gate is desired, the additional two inputs, D and E, are applied simultaneously to gates 58 and 60 during their phase III pump activation. At the start of the second cycle, gate 62 is activated by the recurrence of phase I pump and information is transferred to it from gates 56 and 58. Gate 62 also receives the complementary output signal from gate 60. At the end of the phase I clock signal, the exclusive OR gate output information $A \oplus B \oplus C \oplus D \oplus E$ is made available.

The importance of so simple a formulation of an exclusive OR gate is apparent when the output from this gate is interpreted. Specifically, the binary ONE output of this exclusive OR gate is present only when an odd number of inputs are binary ONE's.

For example, consider the three-input, exclusive OR gate of FIGURE 3. The output of $A \oplus B \oplus C$ from gate 54 is equal to binary ONE only when an odd number of inputs A, B, C are equal to ONE. Thus:

$$A \oplus B \oplus C = (A\bar{B}+\bar{A}B)\bar{C}(\bar{A}\bar{B}+AB)C$$
$$= A\bar{B}\bar{C}+\bar{A}B\bar{C}+\bar{A}\bar{B}C+ABC$$

Thus, the gate provides a ONE output if any one input is ONE or if all three inputs are ONE.

Parity chains and binary addition are two important examples in which an odd number of ONE's must be sensed.

Extension of this concept is possible when there are five inputs to the exclusive OR gate of FIGURE 3. If inputs D and E are added, the output is $A \oplus B \oplus C \oplus D \oplus E$. That is, a ONE output is available if one, three or five inputs are ONE.

FIGURE 4A illustrates the entire four-bit majority logic multiplier. The four-bit binary number WXYZ is to be multiplied by the four-bit binary number KLMN. This is arithmetically shown in the usual longhand method in FIGURE 4C. It is, of course, accomplished by first providing a group of partial-product rows referenced in FIGURE 4C as 110, 112, 114 and 116. These partial products are then summed by column to provide a complete product.

This is not the method generally used in digital computation, especially where high-speed parallel addition is available. Often multiplication is accomplished by repetitive addition with the adder and the multiplier being one and the same circuit.

As previously noted, one of the drawbacks of a parametrically designed computer is its inability to be straightforwardly operated in a parallel manner. Thus, even a single addition is accomplished serially and operating time is lost. Multiple additions, therefore, become prohibitive and a separate multiplier is required. The present device is such a multiplier.

The four-bit multiplier of FIGURE 4A, with legends as defined in FIGURE 4B, requires six cycles for complete multiplication. A cycle is the time between phase repetitions. After three cycles the least significant digit A is produced at the digit D location. The remaining digits, B through H, shown along the right-hand edge of the figure, are produced in the next three cycles. Its operation is as follows.

Four binary digits (bits) KLMN are respectively applied to majority logic gates 400, 402, 404 and 406. This four-bit number is the multiplier. It is maintained (ON) into gates 400, 402, 404 and 406 only during the first cycle. The four-bit multiplicand WXYZ is similarly applied to constant parametric majority logic gates 414, 412, 410 and 408. However, in this case, the multiplicand is maintained (ON) continuously by these constant parametron gates. These gates are so denoted in FIGURE 4A and so defined in FIGURE 4B.

During the overlap portion between phase I and phase II of the first cycle, the multiplier information KLMN contained in gates 400, 402, 404 and 406 resulting from the application of the multiplier signal, is transferred to gates 416, 418, 420 and 422. Note that three of these four gates, namely, 418, 420 and 422, are OR gates, which are defined in FIGURE 4B as having a position input bias. The word "positive," as previously mentioned, corresponds to a binary ONE. Similarly, gates having a negative sign within the circle are defined as AND gates having a negative input bias, the word "negative" corresponding to a binary ZERO.

To generalize the construction of these AND and OR gates having $n$ inputs, the following rules may be stated:

(1) An $n$-input AND gate is formed by applying $n$ inputs to a majority gate along with $n-1$ ZERO bias inputs.

(2) An $n$-input OR gate is formed by applying $n$ inputs to a majority gate along with $n-1$ ONE bias inputs.

Thus, in either case, the gate function, that is, AND or OR, is determined by the binary bias signal applied to its input. Further, the gate requires one less bias signal than the number of inputs applied.

For example, an $n=3$ input AND gate also requires one less than 3, or 2 binary ZERO bias input signals. Thus, the gate is actually a five-input gate, when the bias inputs are considered. For an $n=2$ input OR gate, only a single binary ONE bias input signal is required, so the gate is considered a three-input gate.

The gates 418, 420 and 422 are OR gates with two variable inputs and therefore also require a single positive bias (binary ONE) signal. For purposes of clarity, the bias signals in all of the AND and OR gates shown in FIGURE 4A have been omitted. However, the simple calculation noted above will indicate their location, quantity and polarity.

Continuing the operative explanation of FIGURE 4A the overlap portion between phase II and phase III will enable the transfer of the output signals from majority logic gate 416 and from the OR gates 418 and 420 into majority gates 424, 426 and 428. The output signal from OR gate 422 is also simultaneously applied to AND gate 430 and majority gate 432. This completes the first cycle, and the multiplier signal KLMN, previously noted as having been ON for the first cycle, is discontinued since its presence is no longer necessary.

Signals from K, L and M are passed through gates 434, 436 and 438, respectively, and successively applied to OR gate 422. Thus, the four bits KLMN, which are applied in parallel to the multiplier, are serially applied to AND gate 430. They are successively separated by a one-cycle period.

These multiplier signals KLMN are also applied to AND gates 444, 458 and 472. However, this is accomplished in a phase sequential manner. That is, the N signal, applied to AND gate 430 during phase III of the first cycle, is applied to AND gate 444 during phase I of the second cycle, and so on.

The multiplicand signal ZYXW is applied constantly, by gates 408, 410, 412 and 414, to the AND gates 430, 444, 458 and 472. The coincidence of a multiplier digit signal and a multiplicand digit signal at these AND gates causes the production of a partial-product digit. The partial-product digit produced by activation of AND gate 30 is applied to a half adder comprised of majority logic OR gate 440 and majority logic AND gates 442 and 448.

The successive partial-product digits from AND gates 444, 458 and 472 are each in turn phase sequentially applied to respective exclusive OR gates.

The signal from AND gate 444 is applied to an exclusive OR gate comprised of majority logic gates 452, 456 and 464. Next, the signal from AND gate 458 is applied to an exclusive OR gate comprised of majority logic gates 468, 470 and 484. Finally, the signal from AND gate 472 is applied to an exclusive OR gate comprised of majority logic gates 488, 490 and 504.

The output signals of these exclusive OR gates are returned to the input of the exclusive OR gate which precedes it by a full cycle, the output signal from the earliest exclusive OR gate being applied to the input of the half adder previously described.

Each of the exclusive OR gates includes a carry generating portion and a carry receiving portion. Thus, the exclusive OR gate comprised of majority logic gates 468,

470 and 484 includes a carry generating portion gate 470, and a carry receiving portion, gate 484. Between each pair or exclusive OR gates is a means of propagating the carry digit from one summing column to the one of next higher order. This carry propagation between columns is accomplished by and through majority logic gates 450, 466, 486 and 506. The fact that these are located in each phase provides a significant feature of the invention, since it allows a carry to be propagated during each phase. Thus, carry digit signals are provided in the present case at a rate three times as fast as they would be in the usual case where a single carry signal per clock cycle is generated.

Thus, using an exclusive OR gate or adder as a basic building block, a multiplier can be built which essentially adds and shifts, repeatedly yielding one additional bit of the product each clock time. The output bits A, B, C, D, E, F, G and H are provided at the majority logic gates indicated as X and referenced as 508, 510, 512, 514, 516, 518, 520 and 522. The initial output bit, however, does not occur until after a two-cycle delay. Thus, for a 20-bit word and a 250 kc./sec. clock rate, if the access and control times are excluded, a multiply time of 88 microseconds is required. This is calculated as follows:

$$\frac{22 \text{ cycles}}{250{,}000 \text{ cycles/sec.}} = 88\times10^{-6} \text{ sec.}$$

What has been shown and described is a four-bit majority logic multiplier which utilizes a plurality of majority logic gates together with majority logic AND and OR gates to provide a device which performs the process of multiplication in a manner which closely resembles the process used in longhand manual multiplication.

While there have been shown and described the fundamentally novel features of the invention as applied to the preferred embodiment it will be understood that various omissions, substitutions or changes in the form or details of the device illustrated or in its operation may be made by those skilled in the art without departing from the spirit of the invention. It is the intention, therefore, to be limited only as indicated by the scope of the following claims.

What is claimed is:

1. A majority logic binary multiplier circuit comprising a plurality of stagger-connected logic exclusive OR gates interconnected to provide rows of successive partial-products in a phase sequential manner, a plurality of carry propagating means, one of said plurality of carry propagating means coupled between each adjacent pair of said plurality of exclusive OR gates to propagate carry digit signals between said rows at a phase sequential rate, and summing means connected to receive and to add together said successive rows of partial products and the carry digits of each of said rows and to provide the total summation of all of said rows.

2. The binary multiplier circuit as set forth in claim 1 in which each of said exclusive OR gates includes a carry generating portion and a carry receiving portion, said carry generating portion of each of said plurality of exclusive OR gates being logically coupled to the carry receiving portion of the adjacent exclusive OR gate of higher digital order.

3. The binary multiplier circuit as set forth in claim 1 in which each of said plurality of carry propagating means includes a majority logic gate connected between each of said adjacent pairs of exclusive OR gates.

4. The majority logic binary multiplier circuit comprising a first plurality of majority logic gates parallel connected to a binary source of multiplier information, a second plurality of majority logic gates parallel connected to a binary source of multiplicand information, a third group of serially interconnected majority logic gates, a plurality of logical AND gates each correspondingly and respectively connected to individual gates of each of said pluralities of majority logic gates, and a plurality of majority logic exclusive OR gates parallel connected in a staggered fashion to said plurality of logical AND gates to provide sequential operation of said exclusive OR gates in which binary digits of corresponding order of the first two rows of a multiplication operation are initially added together and their sum is thereafter added to correspondingly ordered bits of a partial-product row of said multiplication operation in which a majority logic multiplier circuit is provided which operates in a manner similar to longhand multiplication.

5. A majority logic binary multiplication circuit comprising a first plurality of majority logic gates parallel connected to a binary source of multiplier information, a secondary plurality of majority logic gates parallel connected to a binary source of multiplicand information, a third plurality of serially interconnected majority logic gates connected to said first plurality of logic gates, a plurality of majority logic AND gates each having first input terminals correspondingly and respectively connected to the second plurality of majority logic gates connected to said source of multiplicand information and each of said AND gates having a second input terminal connected to at least one of said third plurality of majority logic gates, a plurality of majority logic exclusive OR gates connected in a staggered fashion to said plurality of majority logic AND gates to sequentially provide a partial-product sum, and a plurality of exclusive OR gate logical intercoupling means, each interconnecting a portion of one to a portion of another of said exclusive OR gates, in which said multiplier and said multiplicand information are multiplied through a sequential series of summations of the first two rows of said partial-product sums and their sum thereafter added to the bits of the following partial-product row to provide a majority logic multiplier circuit whose multiplication operation closely resembles the longhand method of multiplication.

6. A four-bit majority logic binary multiplier circuit comprising a first plurality of majority logic gates parallel connected to a four-bit binary source of multiplier information, a second plurality of majority logic gates parallel connected to a four-bit binary source of multiplicand information, a third group of serially interconnected majority logic gates connected to said first plurality of logic gates, a plurality of logical AND gates each having first input terminals correspondingly and respectively connected to individual gates of said second plurality of majority logic gates and second input terminals sequentially connected to said serially interconnected gates and a plurality of majority logic exclusive OR gates connected to said logical AND gates, said exclusive OR gates parallel connected in a sequentially staggered fashion to provide sequential operation of said exclusive OR gates in which the corresponding columns of the first two rows of a multiplication operation are initially added together and their sum thereafter added to the corresponding columns of the succeeding rows of said multiplication operation to provide a majority logic multiplier circuit operative in a manner similar to longhand multiplication.

7. A majority logic multiplier using parametric elements and operated from a three-phase power system comprising a plurality of majority logic gating means connected in a parallel manner to a source of multiplier information, a plurality of constantly-operating majority logic gates connected to the source of multiplicand information, a plurality of majority logic AND gates connected for operation by separate phases of said three-phase power system, a half adder circuit connected to one of said majority logic AND gates, and a plurality of majority logic exclusive OR gates connected to each of said remaining plurality of majority logic AND gates in which the digits of said multiplier are sequentially multiplied by the digits of said multiplicand information in each of said majority logic AND gates and the partial products resulting therefrom are fully added by sequentially adding the corresponding products of said partial-product rows to provide a majority logic multiplier whose operation resembles longhand multiplication.

8. A parametric majority logic binary multiplication circuit operated from a three-phase power source comprising a first parametric majority logic input means connected to a source of binary digit multiplier information, a second parametric majority logic input means connected to a source of binary digit multiplicand information, a plurality of parametric majority logic AND gates each commonly connected in phase sequence to said first and second input means, a plurality of parametric majority logic exclusive OR gates respectively connected to said plurality of majority logic AND gates, a plurality of majority logic intercoupling means respectively interconnected between said plurality of exclusive OR gates and a plurality of parametric majority logic output means respectively connected to said exclusive OR gates to provide a binary multiplier whose operation resembles longhand multiplication.

9. A four-bit parametric majority logic multiplier, having parametrons which are activated by a three-phase source of power, comprising parametric majority logic multiplier and multiplicand input means respectively connected in parallel to the binary multiplier and binary multiplicand information source, a first, a second, a third and a fourth parametric majority logic AND gate connected to said multiplier and said multiplicand means, said AND gates connected for sequential activation by separate phases of said three-phase power source, a logical binary half adder connected to said first AND gate, and a first, second and third parametric majority logic exclusive OR gates being serially interconnected to provide the carries of said sums and serially connected to said half adder, to enable the bits of said multiplier to be sequentially multiplied by the bits of said multiplicand and the partial products provided by each multiplication to be added row by row to form a complete product.

10. A method of performing binary multiplication comprising the steps of simultaneously applying a plurality of binary multiplier digit signals and a plurality of binary multiplicand digit signals to the input means of a majority logic multiplier circuit, thereafter continuously applying said multiplicand digit signals to a plurality of majority logic AND gates, next phase successively applying each of said binary multiplier digit signals in serial sequence to each of said plurality of AND gates during successive phases of the cyclically repetitive circuit power source, thereafter applying the columns of partial-product output signals from said AND gate plurality to a corresponding plurality of stagger-connected majority logic exclusive OR gates, next, phase sequentially adding the rows of corresponding columns of products in said exclusive OR gates.

11. A method of performing binary multiplication comprising the steps of simultaneously applying a plurality of binary multiplier digit signals and a plurality of binary multiplicand digit signals to the input means of a majority logic multiplier circuit, thereafter continuously applying said multiplicand digit signals to a plurality of majority logic AND gates, next phase successively applying each of said binary multiplier digit signals in serial sequence to each of said plurality of AND gates during successive phases of the cyclically repetitive circuit power source, thereafter applying the plurality of columns of phase successive partial product output signal from said AND gate plurality to a corresponding plurality of stagger-connected logically intercoupled majority logic exclusive OR gates, in which said columns of partial-product signals are phase sequentially added by row and carry digit signals resulting from such column by row addition are sequentially generated by said exclusive OR gates and phase sequentially propagated by said logical intercoupling into an exclusive OR gate of the adjacent higher order column.

12. A method of performing binary multiplication comprising the steps of simultaneously applying a plurality of binary multiplier digit signals and a plurality of multiplicand digit signals to a majority logic multiplier circuit input means, next sequentially applying said plurality of multiplicand signals respectively to a corresponding plurality of majority logic AND gates and successively applying each of said plurality of multiplier digit signals in serial sequence to each of said plurality of AND gates to produce therefrom a plurality of columns of partial-product signals in staggered sequence, thereafter applying said plurality of partial-product signals to a respectively staggered plurality of intercoupled exclusive OR gates in which said partial-product signals in a corresponding column location are added row by row, while carry digit signals generated by said row additions are sequentially propagated for addition into the next higher order column.

13. The multiplication method as set forth in claim 12 in which said step of simultaneously applying said pluralities of digit signals to said circuit input means includes the steps of discontinuously applying said plurality of multiplier digit signals and continuously applying said plurality of multiplicand digit signals.

14. A method of performing binary multiplication comprising the steps of sequentially applying a plurality of multiplicand signals respectively to a corresponding plurality of majority logic AND gates and successively applying each of said plurality of multiplier digit signals in serial sequence to each of said plurality of AND gates to produce therefrom a plurality of columns of partial-product signals in staggered sequence, thereafter fully adding by row corresponding bits of said columns of partial products in staggered sequence, generating necessary carry digit signals from each of said row additions and sequentially propagating said generated carry digit signals into the next higher order column for addition therein.

References Cited

UNITED STATES PATENTS

| | | | |
|---|---|---|---|
| 2,987,253 | 6/1961 | Schreiner et al. | 235—176 |
| 2,988,277 | 6/1961 | Yamada | 235—175 |
| 3,302,008 | 1/1967 | Mitchell | 235—156 |
| 3,299,260 | 1/1967 | Cohen | 235—173 |

OTHER REFERENCES

H. Terada: The Parametron—An Amplifying Logic Element, Control Engineering, April 1959, pp. 110–115.

E. Goto: The Parametron, a Digital Computing Element which Utilizes Parametric Oscillation, Proceedings of the IRE, August 1959, pp. 1304–1316.

R. L. Wiginton: A New Concept in Computing, Proceedings of the IRE, April 1959, pp. 516–523.

MALCOLM A. MORRISON, Primary Examiner

DAVID L. MALZAHN, Assistant Examiner

U.S. Cl. X.R.

235—176